(12) United States Patent
Delker et al.

(10) Patent No.: US 8,036,646 B1
(45) Date of Patent: Oct. 11, 2011

(54) RIGHT-SIZED MULTIMEDIA CONTENT DISTRIBUTION OVER A CELLULAR NETWORK

(75) Inventors: Jason R. Delker, Olathe, KS (US); Robin D. Katzer, Olathe, KS (US); Todd N. Koellner, Overland Park, KS (US); Brian D. Mauer, Shawnee, KS (US); Sei Y. Ng, Olathe, KS (US); M. Jeffrey Stone, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 632 days.

(21) Appl. No.: 12/124,885

(22) Filed: May 21, 2008

(51) Int. Cl.
*H04M 3/42* (2006.01)
(52) U.S. Cl. ...... 455/414.2; 705/313; 713/194; 726/26; 726/30; 709/203; 715/236; 715/713
(58) Field of Classification Search ...... 455/414.2; 713/194; 726/30, 26; 709/203; 705/313; 715/236, 713
See application file for complete search history.

(56) References Cited

U.S. PATENT DOCUMENTS

| | | | |
|---|---|---|---|
| 6,895,005 | B1 | 5/2005 | Malin et al. |
| 7,194,551 | B1 | 3/2007 | Moll et al. |
| 7,206,593 | B1 | 4/2007 | Yarkosky et al. |
| 7,499,468 | B2 | 3/2009 | Montgomery, Jr. |
| 2002/0147979 | A1 | 10/2002 | Corson |
| 2003/0073435 | A1 | 4/2003 | Thompson et al. |
| 2005/0042983 | A1 | 2/2005 | Borgward |
| 2006/0015904 | A1 | 1/2006 | Marcus |
| 2006/0161635 | A1 | 7/2006 | Lamkin et al. |
| 2010/0275040 | A1* | 10/2010 | Ginter et al. ............ 713/194 |
| 2010/0275272 | A1* | 10/2010 | Risan et al. ............ 726/30 |
| 2010/0281364 | A1* | 11/2010 | Sidman ............ 715/713 |
| 2010/0281544 | A1* | 11/2010 | Risan et al. ............ 726/26 |
| 2010/0287461 | A1* | 11/2010 | Paila et al. ............ 715/236 |
| 2010/0293221 | A1* | 11/2010 | Sidman et al. ............ 709/203 |
| 2010/0299274 | A1* | 11/2010 | Rappaport ............ 705/313 |
| 2010/0301112 | A1* | 12/2010 | Lapstun et al. ............ 235/375 |

OTHER PUBLICATIONS

Delker, Jason R.,et al., Patent Application entitled, "Download Prioritization for Intelligent Content Distribution," filed Jun. 4, 2008, U.S. Appl. No. 12/133,351.
Notice of Allowance dated May 26, 2011, U.S. Appl. No. 12/133,351, filed on Jun. 4, 2008.

* cited by examiner

*Primary Examiner* — William D Cumming (57) ABSTRACT

Systems and methods of wirelessly transmitting multimedia data over a cellular network are disclosed which may, in some embodiments, comprise transmitting a segmented multimedia content from a data center to a base transceiver station, transmitting the content from the base transceiver station to a wireless device, and tracking a usage of the content by a user on the wireless device. These systems and methods may further comprise transmitting the usage of the content of the user to the base transceiver station, transmitting the usage of the content of the user from the base transceiver station to the data center, and creating a customized content based on the usage of the content on the wireless device by the user. In addition, these systems and methods may also further comprise transmitting the customized content to the base transceiver station and transmitting the customized content from the base transceiver station to the wireless device.

20 Claims, 10 Drawing Sheets

RIGHT-SIZED MULTIMEDIA CONTENT DISTRIBUTION OVER A CELLULAR NETWORK

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Wireless networks permit the conveyance of multimedia content to wireless users. This content may include information that is delivered to an end user in the form of audio, video, and other content of interest to a wireless user. This content allows a wireless user to obtain information delivered directly to the wireless user while the wireless user is mobile.

While multimedia content offers rich content to a user, this content must be delivered to a wireless user. Several constraints may exist in a network that limit the amount of content that may be delivered to a user including the available bandwidth provided by a local wireless base transceiver station, the number of concurrent users in the area, and interference that may be present.

SUMMARY

In one embodiment, a method of wirelessly transmitting multimedia data over a cellular network is disclosed which may comprise transmitting a content from a data center to a base transceiver station, transmitting the content from the base transceiver station to a wireless device, and tracking a usage of the content by a user on the wireless device. This method may further comprise transmitting the usage of the content of the user to the base transceiver station, transmitting the usage of the content of the user from the base transceiver station to the data center, and creating a customized content based on the usage of the content on the wireless device by the user. In addition, this method may also further comprise transmitting the customized content to the base transceiver station and transmitting the customized content from the base transceiver station to the wireless device.

In another embodiment, a system for providing customized multimedia wireless data to a user is disclosed that comprises a wireless device that receives customized content, plays the customized content for a user, and records a use pattern of the user. This wireless device may also transmit the use pattern of the user. In addition, this system may comprise a base transceiver station that is capable of transmitting content to the wireless device and receiving the use pattern of the user from the wireless device. This system may further comprise a data center that is capable of receiving the use pattern of the user from the base transceiver station, creating customized content for the user based upon the use pattern of the user, and transmitting the customized content to the user.

In yet another embodiment, a method of repackaging multimedia data on a wireless device is disclosed that may comprise receiving a plurality of content segments onto a wireless device, determining the priority of the content segments based upon user preferences, and reordering the content segments based upon the priority of the content segments. This method may, in some embodiments, repackage the content segments for a user.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

It should be understood at the outset that although an illustrative implementation of one embodiment of the present disclosure is illustrated below, the present system may be implemented using any number of techniques, whether currently known or in existence. The present disclosure should in no way be limited to the illustrative implementations, drawings, and techniques illustrated below, including the exemplary design and implementation illustrated and described herein, but may be modified within the scope of the appended claims along with their full scope of equivalents.

Modern wireless devices have the ability to receive and display rich multimedia content. This content may include news, entertainment, or other multimedia content of interest to a user. However, wireless networks only have the ability to transmit a finite amount of information to wireless users. There are many constraints that limit the amount of information and content that the wireless network can carry, these constraints include the bandwidth of the data center, the bandwidth of the cell towers, the bandwidth of the handset, the range of the cell towers, and the bandwidth connecting the cell towers to the data center.

Due to the network and wireless device constraints, it would be valuable to have systems and methods that could create personalized right-sized content for a particular purpose, such as a commute, and then providing this right-sized content to a wireless user. The phrase "right-sized content" refers to sending sufficient content to a user for a particular purpose without sending too much content or wasting available network resources. Sending too much content to a wireless device wastes valuable network resources. Sending too little content results in a poor user experience. In the discussion of right-sized material, two metrics may be discussed. The first metric is how much content is delivered (e.g. how much data is delivered to the wireless user through the network) which can be measured in bytes, and the second metric is how long payback of the content that is delivered to the user consumes (e.g. 10 minutes of content, 30 minutes of content, etc.) which can be measured in time. Right-sizing may, in some embodiments, refer to providing enough content for a purpose, such as a commute, without wasting network resources. One problem is determining how much content and how long the right-sized content should be, as the time that the commute may take may vary from day to day. One method of addressing this problem is by breaking up the right-sized content into segments.

Right-sized content may, in some embodiments, be broken up into segments. For instance, in the example above of a commute, there may be ten segments within the right-sized content. These segments may be used as a way of both adjusting the length of the right-sized content as well as providing customized content to the wireless device. For instance, the total playing time of the ten segments may be fifteen minutes longer than the commute. If the commute is only half of the time expected, the right-sized content will play only segments that will fit within the time of the commute. The choice of which segments to play may be based upon the user preferences of content. If the commute is longer than expected (e.g. because of a traffic accident), all segments might be played, thereby extending the playback time of the right-sized content. This approach to playback has the advantage of allowing the wireless device to adjust the playback time. Another advantage of using segments is that a user may skip segments that they are not interested in, and may request more information from segments that they are interested in.

Using right-sized content may promote transmitting content to a wireless device at any time. Traditional systems allow a wireless device to contact and request content from a data center. However, these systems may have difficulty handling peak traffic when a plurality of requests for content are made simultaneously, and when these plurality of requests for content exceed one or more of the bandwidth constraints contained within the data network. One method of overcoming these constraints is to transmit the right-sized content during off-peak hours for storage on the wireless device for playback later during peak communication traffic time, for example during a commute to work. Another method, or a complementary method, of overcoming these constraints is to transmit the right-sized content or some of the right-sized content to a plurality of staging areas downstream from the data center or other content source. The right-sized content may be staged at the base transceiver station and/or at data storage nodes accessible from the base transceiver station or the network. Using staging of the right-sized content, in some cases, may reduce the peak demands on the core network, such as at the data center or other content source. Using right-sized content allows for the customizing of content based on user preferences, and the transmission of content to a user during off peak hours thereby reducing demands upon a wireless network, as well as other advantages disclosed herein. The content may comprise audio content, video content, text content, multimedia content, and other content.

Figure 1:
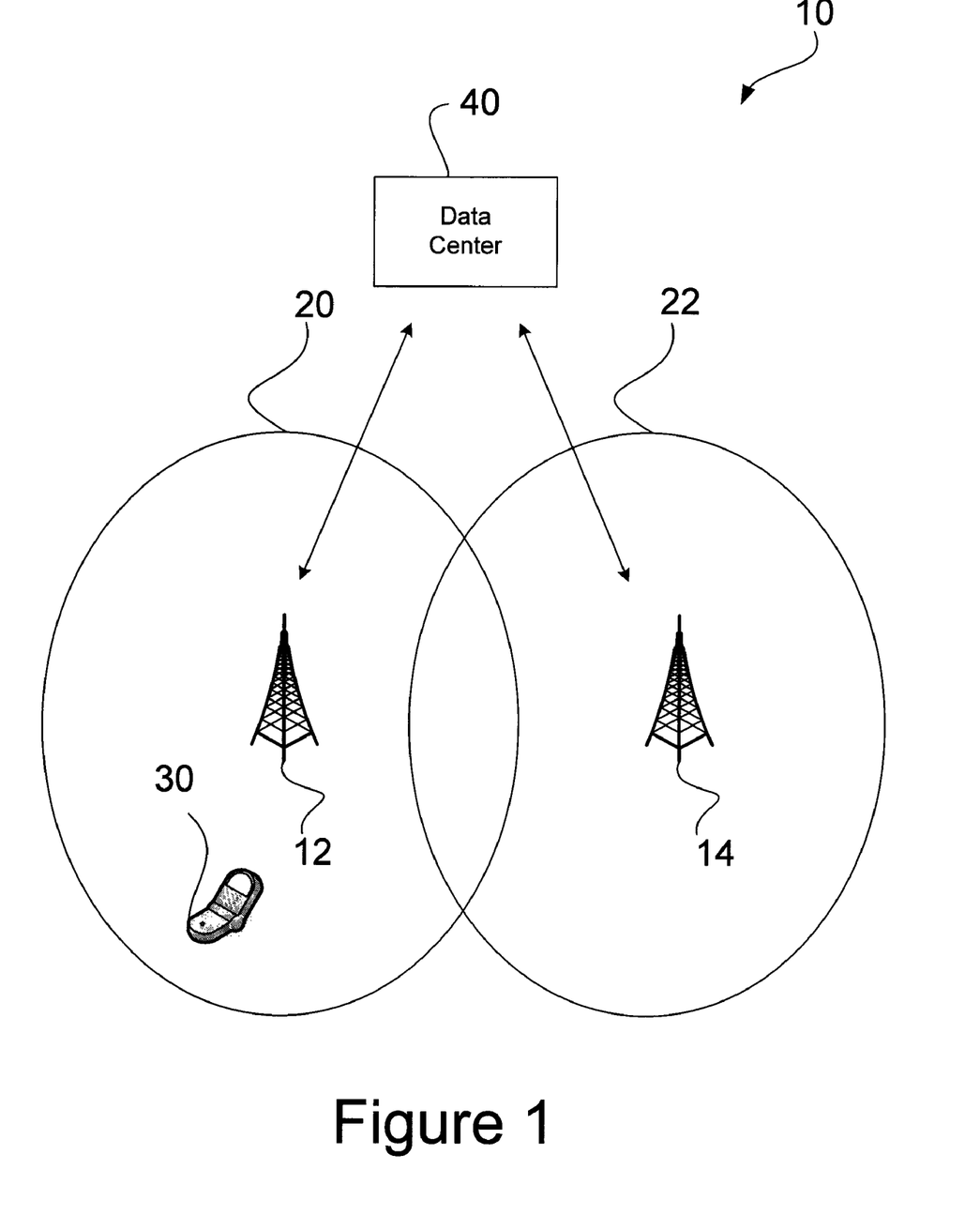
FIG. 1 illustrates a system according to an embodiment of the disclosure.

FIG. 1 is an example of a data network 10 that could be used consistent with embodiments disclosed herein. In this example embodiment, a first base transceiver station 12 with a first wireless coverage area 20 and a second base transceiver station 14 with a second wireless coverage area 22 are used to deliver information to a plurality of wireless devices. A wireless device 30 is within the range of the first base transceiver station 12. In the example shown in FIG. 1, the wireless device 30 may be in motion during the content usage period and may remain within the first coverage area 20 of the first base transceiver station 12 while receiving right-sized content. For instance, the wireless device 30 may receive content early in the morning, for example at 5 A.M. and then play this content back during a morning commute. The wireless device 30 may receive the right-sized content from a data center 40. The data center 40 is able to track the usage of the right-sized content so as to customize the content that is transmitted to the wireless device 30.

The wireless device 30 is intended to refer to any device capable of receiving a wireless data signal, including, but not limited to, a mobile telephone, a personal digital assistant (FDA), a media player, or a mobile computer equipped with a wireless interface. It is expressly understood that any device can be the wireless device 30 so long as it is equipped with the ability to send and receive wireless information from the first base transceiver station 12 or the second base transceiver station 14.

One embodiment presently disclosed is that right-sized content may be played back during a commute. However, the length that a commute takes may vary from day to day. Therefore, the length of the right-sized content may be adjusted to fit within the commute while still providing the user requested content. In order to make this adjustment, systems and methods are disclosed which allow either some or all of the segments of the right-sized content to be used and/or adjusted in length. In order to make the determination of how much of the right-sized content should be played, the wireless device 30 or other entity may make a determination of the anticipated length of playback. For example, in the context of a commute, if the wireless device 30 or other device knows the route that the wireless device 30 travels, it will have a starting and a stopping location. This information of the anticipated stopping location might be coupled with awareness of the current location of the wireless device. The position of the wireless device 30 might be determined using a global positioning system (GPS), tower triangulation, or other method known to one skilled in the art. In the event that the wireless device 30 is closer to the stopping location than is expected (e.g. at the current position of wireless device 30 the user has only played 5 minutes of content, while usually at this position has played 20 minutes of content), only those segments which are most relevant might be played. By skipping less relevant segments, the user's experience is customized based upon the user preferences. In the event that the wireless device 30 is moving slower than expected (e.g. at the current position of the wireless device 30, the user has played 20 minutes of content, while usually at this position the user has only played 5 minutes of content), the entire content available in right-sized content may be played. In addition, if a user of the wireless device 30 shows that they are not interested in certain content, that content may be automatically skipped in lieu of other portions of the right-sized content. Generally, knowledge, for example stored information from earlier commutes or travel associated with the wireless device 30, of the normal travel route, the normal travel duration, the current location of the wireless device 30 during a commute or other travel, and the elapsed time of the current commute may be used to adjust and/or repackage segments. Additionally, in some embodiments it may be possible to receive data or travel reports from other wireless devices 30 traveling a common route and/or path with the subject wireless device 30 to anticipate a commuting slowdown in advance and begin the adjustment and/or repackaging of segments before an actual commuting delay is experienced by the subject wireless device 30.

In the embodiment illustrated in FIG. 1, the wireless device 30 may subscribe to one or more sources of content. Data center 40 collects segments of content and transmits the content to the wireless device 30. Playback of these segments of content may be skipped by the wireless device 30, or the wireless device 30 may anticipate that these segments of content should be skipped and automatically skip the segments. It is expressly understood that the wireless device 30 may be controlled by a user, the automated programming within and executed by the wireless device, or a combination thereof.

The data center 40 is intended to refer to any server, hardware, or software capable of transmitting content from a source to a destination. The data center 40 may be implemented as any general purpose computer. General purpose computer systems are described in further detail hereinafter. Examples of data centers 40 include, but are not limited to, computer data centers that store content for use by the wireless device 30. Data centers 40 may be in communication with any number of content sources, including Internet sources, as known by one skilled in the art.

In the embodiment wherein the playback of the content is controlled by the user, the right-sized content may be manually skipped or the right-sized content may be played in its entirety. For example, a sporting event was being played and the user is prompted to hear information about another sporting event and skips to the next story.

In the embodiment wherein the playback is controlled by the wireless device 30, the wireless device 30 may select segments that correspond to user preferences for playback. The user's preferences may be determined by explicit user choices (e.g. the user subscribes to certain segments) or implicit user choices (e.g. the user has chosen to play back certain segments, etc.). It is further understood that the user's preferences may be inferred based on a user profile, information provided to the data center 40 through information provided by a user via graphical user interfaces or any other known methods.

Data regarding the user's choice, the length of all segments played, and the segments played back by a user or wireless devices are transmitted to the data center 40. For example, information about what segments were manually skipped and which segments were the subject of a user request for supplemental content may be used by the data center 40 to refine preferences of the user. This allows the data center 40 to determine which segments are most appropriate for the wireless device 30 and the length of content required for the right-sized content. The data center 40 can then update the user preferences stored in the data center 40 that correspond to the wireless device 30 and will alter the segments transmitted to the wireless device 30 going forwards, for example the next day.

Figure 2:
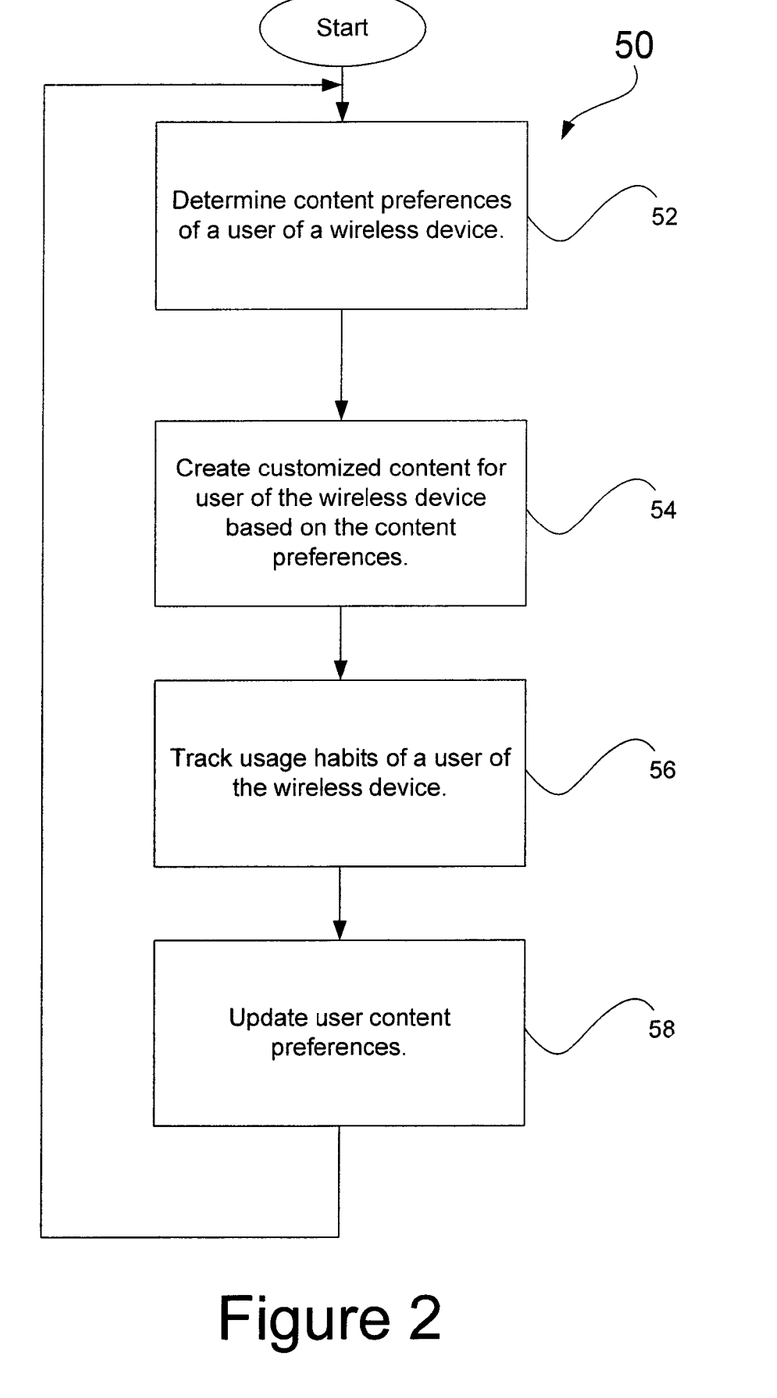
FIG. 2 illustrates a method according to an embodiment of the disclosure.

FIG. 2 is a flowchart of a method 50 for creating customized content. In block 52, the data center 40 determines the content preferences of a user of the wireless device 30. As discussed above, these preferences may be determined through any number of methods including, but not limited to, the requests of the user, the usage pattern of the user, the anticipated pattern of the user, advertisements that may be directed to a user, or any other known preferences. In block 54, the data center 40 creates right-sized customized content for the user of the wireless device 30. In block 56, the wireless usage habits of the user of the wireless device 30 are tracked by the data center 40. In block 58, the data center 40 updates the preferences of the user of the wireless device 30. This process may be repeated as the wireless usage habits of the user are updated. In some embodiments, either the wireless device 30 or the first base transceiver station 12 may determine the content preferences of the user of the wireless device 30 based on the user preferences, for example based on the usage pattern of the user. In these cases, the wireless device 30 or the first base transceiver station 12 requests specific content from the data center 40 based on the user preferences.

Figure 3:
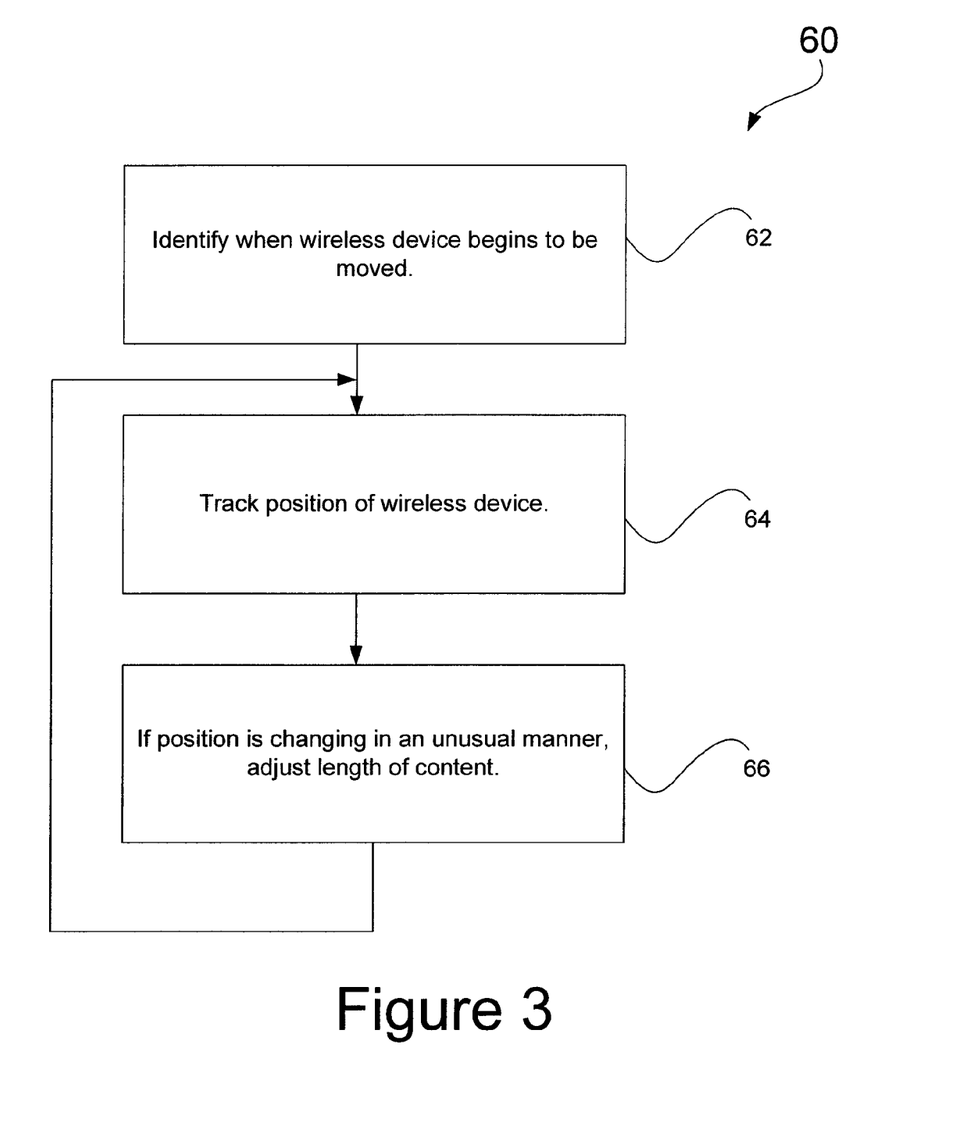
FIG. 3 illustrates a flowchart of wireless system usage according to an embodiment of the disclosure.

FIG. 3 is a flowchart of a method 60 for adjusting playback of the right-sized content based upon the location of the wireless device 30. As previously discussed, the location of the wireless device 30 may be determined based upon a plurality of methods including, but not limited to, GPS, triangulation, or any other way known to one skilled in the art.

In block 62, the method 60 determines when the wireless device 30 begins to be moved. In block 64, the position of the wireless device 30 is monitored. This tracking may be done in any way known to one skilled in the art, including determining the location and speed of the wireless device 30 as compared with previous playbacks of the right-sized content. In block 66, if the position of the wireless device 30 is changing in an unusual manner, the wireless device 30 will adjust the length of the content and/or drop one or more segments of content entirely. For instance, if the wireless device 30 detects that it is closer to the destination point where the user generally shuts off the wireless device 30, the wireless device 30 will play shorter segments of the right-sized content so that the right-sized content is completed by the time wireless device 30 reaches its destination. If the wireless device 30 detects that it is stopped or moving slower than expected, it can extend the length of segments to allow for the right-sized content to fill the available time prior to reaching the location where the user generally turns off the wireless device 30 content. For example, the wireless device 30 may request supplemental content. This process may be repeated to adjust the length of the right-sized content.

Figure 4:
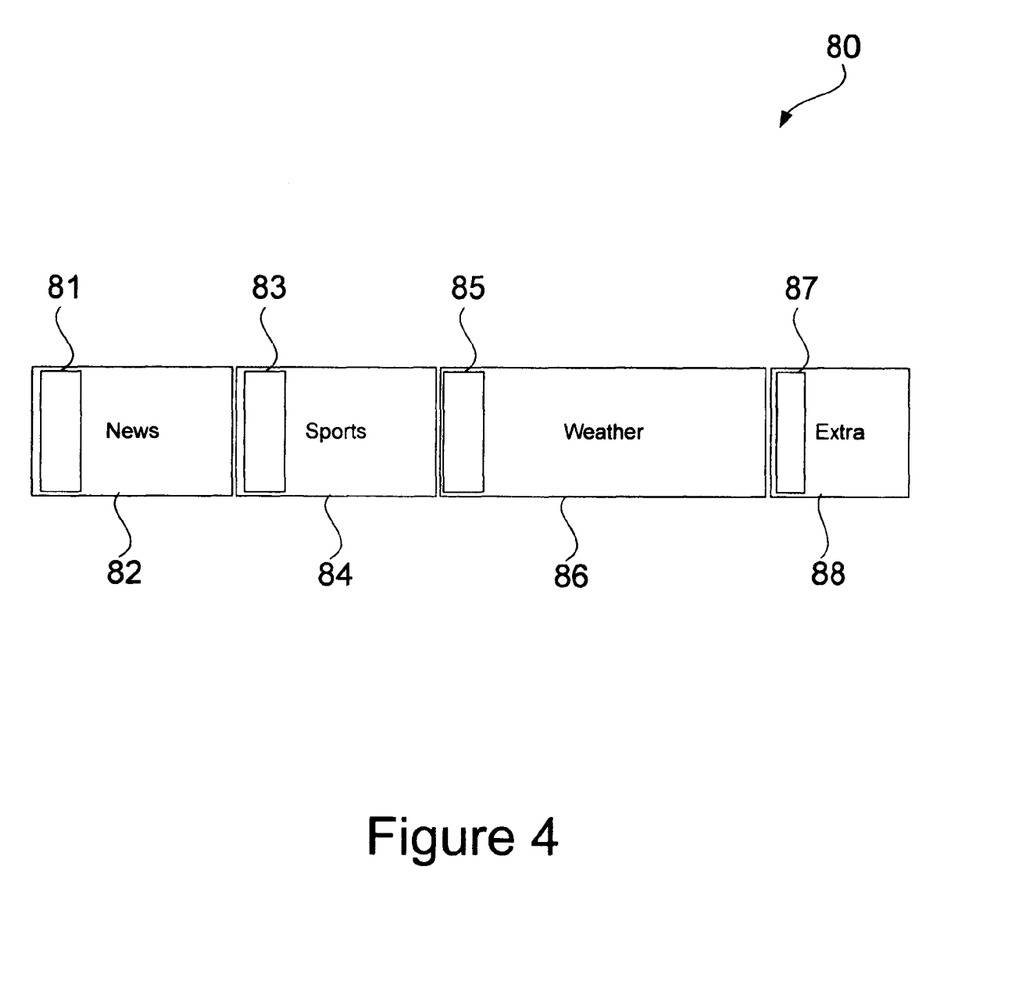
FIG. 4 illustrates a table used in one embodiment of the disclosure.

FIG. 4 is an example of a table 80 that illustrates how right-sized content might be organized. This table has a news block 82, a sports block 84, a weather block 86, and an extra block 88. Each one of these blocks may have, in some embodiments, a smaller content segment within the block. For instance, the news block 82 has a news segment block 81, the sports block 84 has a sports segment block 83, the weather block 86 has a weather segment block 85, and the extra block 88 has an extra segment block 87. One of the advantages of this configuration is that if a user prefers to listen to a small amount of news, the wireless device 30 may only play the news segment block 81 which will give the user some information, but only a small amount of information. In addition, the use of the segments allow the length of playback of the right-sized content to be changed based upon the amount of time available to playback the right-sized content (e.g. if the wireless device 30 is moving faster than expected it may only play the segment blocks, or if the wireless device 30 is moving slower than expected it may play the entire block).

Figure 5:
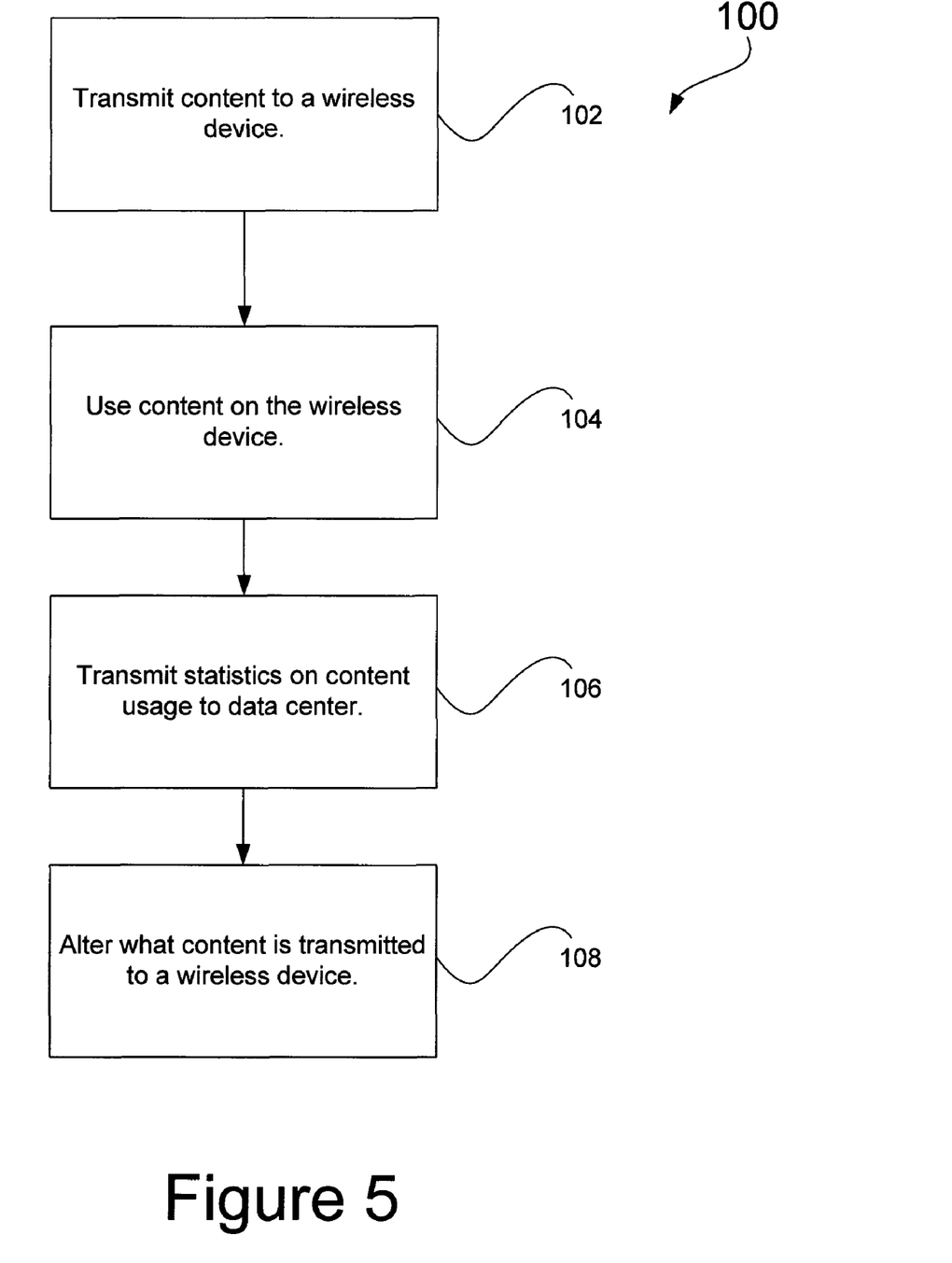
FIG. 5 illustrates a method of delivering content to a wireless device according to an embodiment of the disclosure.

FIG. 5 is an exemplary method 100 illustrating the adjustment of the content that is transmitted to the wireless device 30 as the right-sized content. In block 102, a generic amount of content based upon either general preferences or user specific preferences is transmitted to the wireless device 30. In block 104, the right-sized content is played back on the wireless device 30. During the playback of the right-sized content, the duration that each segment of the right-sized content as well as user choices to hear more information relating to a particular block is tracked and added to the usage information. This usage information further includes the skipping of content or the request for more of a specific subject of content (e.g. news. sports, weather, etc.). In block 106, the wireless device 30 transmits statistics regarding the usage of the right-sized content to the data center 40. In block 108, the data center 40 then adapts the content that is transmitted to the wireless device 30 based upon the usage statistics. As discussed above, in alternative embodiments, the wireless device 30 or the first base transceiver station 12 may adapt the content that is requested from the data center 40 based on the usage of the right-sized content.

Figure 6:
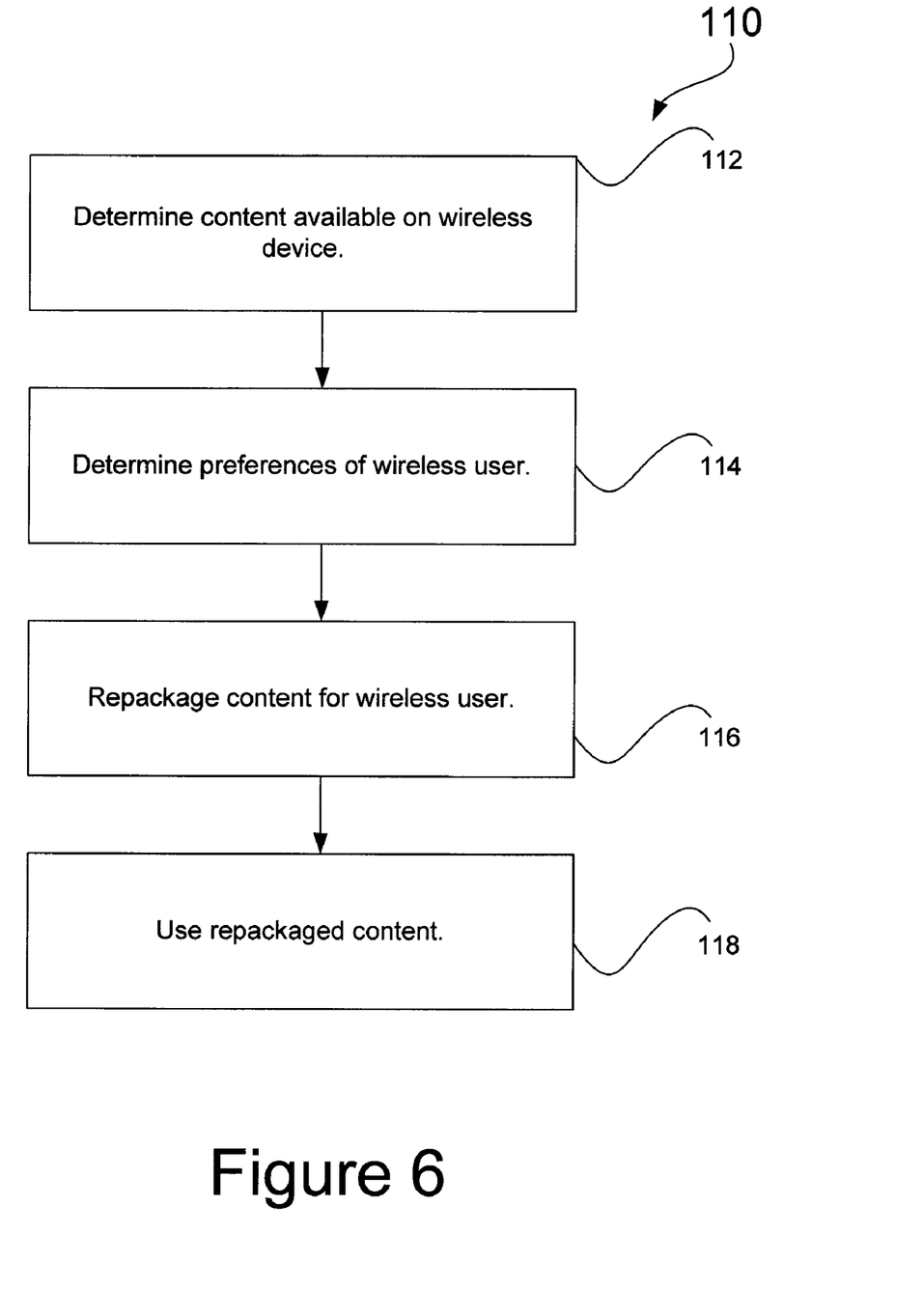
FIG. 6 illustrates a method of customizing content for a wireless device according to an embodiment of the disclosure.

FIG. 6 is a flowchart of a method 110 illustrating repackaging the right-sized content by the wireless device 30. As discussed above, the content is transmitted to the wireless device 30 as segments of content. By transmitting the contents in segments, the wireless device 30 can repackage (e.g. reorder the content, select the length of content to play, etc.). In block 112, the wireless device 30 determines the content that is available on the wireless device 30. In block 114, the wireless device 30 determines the preferences of the wireless user. These preferences may be based upon previous usage, or any other method disclosed herein. In block 116, the wireless device 30 repackages the content for presentation to the user. In block 118 the wireless device 30 presents the repackaged content by playing the repackaged content for the user.

Figure 7:
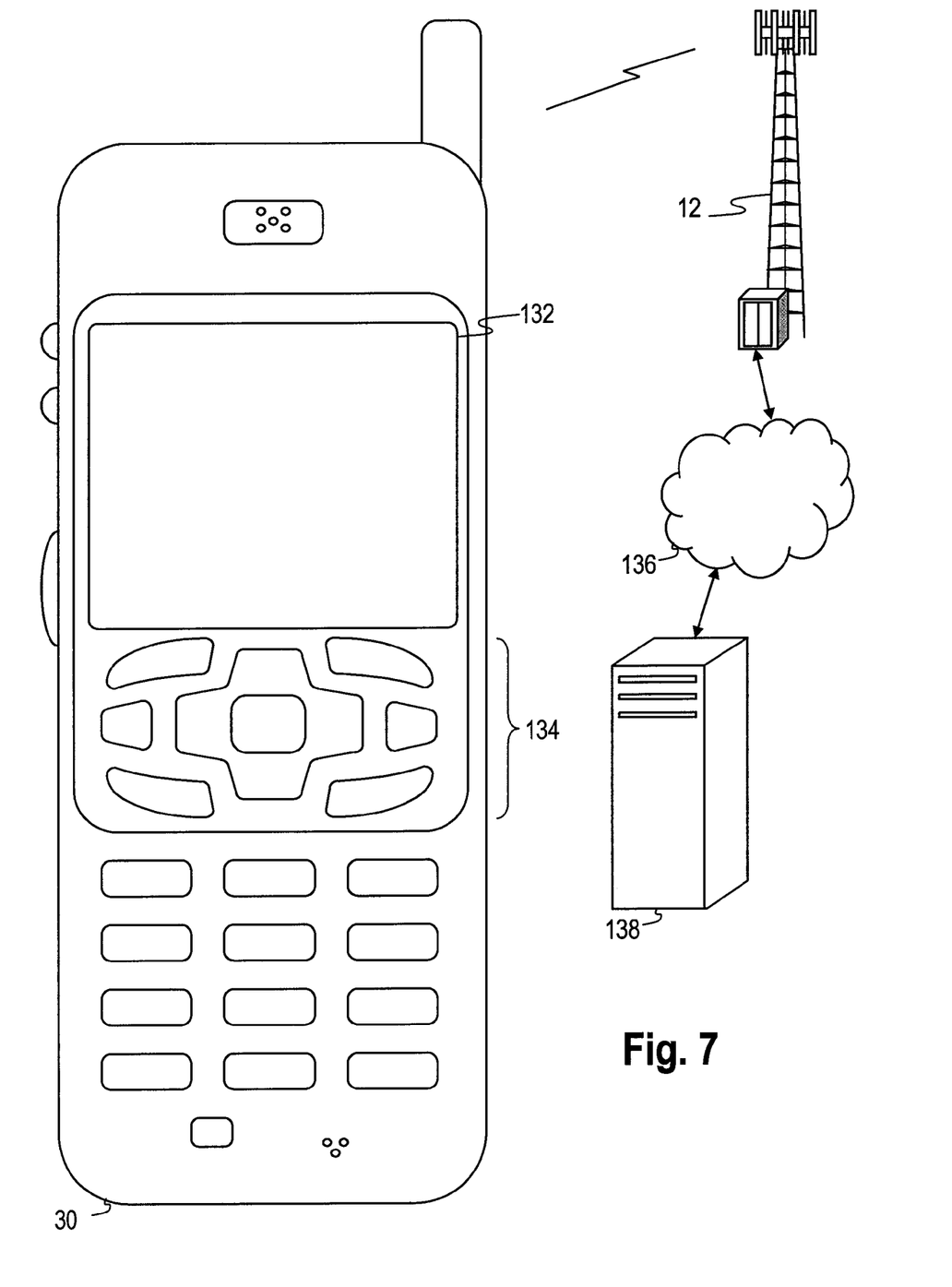
FIG. 7 illustrates an exemplary handset suitable for implementing the several embodiments of the disclosure.

FIG. 7 depicts the wireless device 30, which is operable for implementing aspects of the present disclosure, but the present disclosure should not be limited to these implementations. Though illustrated as a mobile phone, the wireless device 30 may take various forms including a wireless handset, a pager, a personal digital assistant (PDA), a portable computer, a tablet computer, or a laptop computer. Many suitable handsets combine some or all of these functions. In some embodiments of the present disclosure, the wireless device 30 is not a general purpose computing device like a portable, laptop or tablet computer, but rather is a special-purpose communications device such as a mobile phone, wireless handset, pager, or PDA. The wireless device 30 may support specialized activities such as gaming, inventory control, job control, and/or task management functions, and so on.

The wireless device 30 includes a screen 132 and a touch-sensitive surface or keys 134 for input by a user. The wireless device 30 may present options for the user to select, controls for the user to actuate, and/or cursors or other indicators for the user to direct. The wireless device 30 may further accept data entry from the user, including numbers to dial or various parameter values for configuring the operation of the handset. The wireless device 30 may further execute one or more software or firmware applications in response to user commands. These applications may configure the wireless device 30 to perform various customized functions in response to user interaction. Additionally, the wireless device 30 may be programmed and/or configured over-the-air, for example from a wireless base transceiver station, a wireless access point, or a peer wireless device 30.

The wireless device 30 may execute a web browser application which enables the screen 132 to show a web page. The web page may be obtained via wireless communications with the first base transceiver station 12, a wireless network access node, a peer handset or any other wireless communication network or system. The first base transceiver station 12 (or wireless network access node) is coupled to a wired network 136, such as the Internet. Via the wireless link and the wired network, the wireless device 30 has access to information on various servers, such as a server 138. The server 138 may provide content that may be shown on the screen 132. Alternately, the wireless device 30 may access the first base transceiver station 12 through the wireless device 30 acting as an intermediary, in a relay type or hop type of connection.

Figure 8:
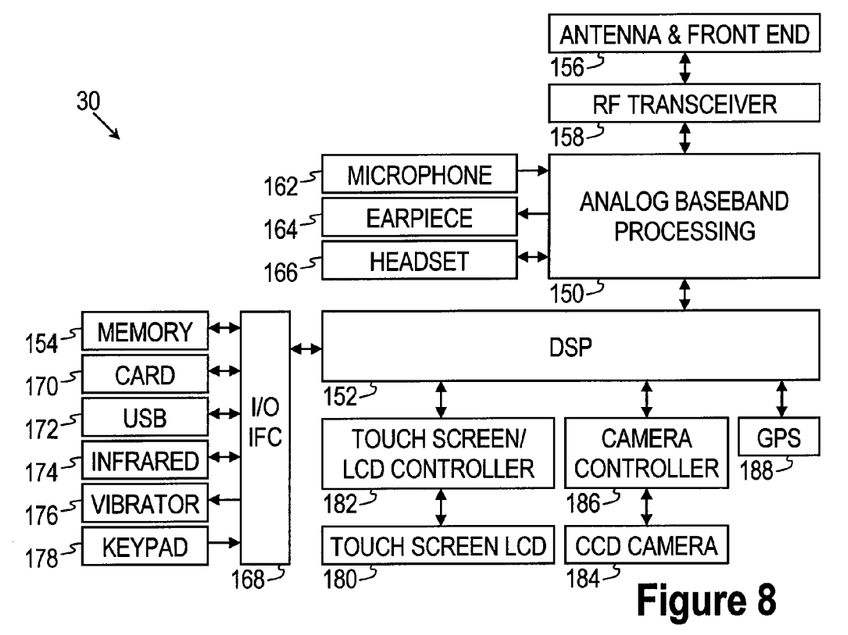
FIG. 8 is a block diagram of a handset suitable for implementing the several embodiments of the disclosure.

FIG. 8 shows a block diagram of the wireless device 30. While a variety of known components of wireless device 30 are depicted, in an embodiment a subset of the listed components and/or additional components not listed may be included in the wireless device 30. The wireless device 30 includes a digital signal processor (DSP) 152 and a memory 154. As shown, the wireless device 30 may further include an antenna and a front end unit 156, a radio frequency (RF) transceiver 158, an analog baseband processing unit 150, a microphone 162, an earpiece speaker 164, a headset port 166, an input/output interface 168, a removable memory card 170, a universal serial bus (USB) interface 172, an infrared port 174, a vibrator 176, a keypad 178, a touch screen liquid crystal display (LCD) with a touch sensitive surface screen 180, a touch screen/LCD controller 182, a charge-coupled device (CCD) camera 184, a camera controller 186, and a global positioning system (GPS) sensor 188. In an embodiment, the wireless device 30 may include another kind of display that does not provide a touch sensitive screen. In an embodiment, the DSP 152 may communicate directly with the memory 154 without passing through the input/output interface 168.

The DSP 152 or some other form of controller or central processing unit operates to control the various components of the wireless device 30 in accordance with embedded software or firmware stored in memory 154 or stored in memory contained within the DSP 152 itself. In addition to the embedded software or firmware, the DSP 152 may execute other applications stored in the memory 154 or made available via information carrier media such as portable data storage media like the removable memory card 170 or via wired or wireless network communications. The application software may comprise a compiled set of machine-readable instructions that configure the DSP 152 to provide the desired functionality, or the application software may be high-level software instructions to be processed by an interpreter or compiler to indirectly configure the DSP 152.

The antenna and front end unit 156 may be provided to convert between wireless signals and electrical signals, enabling the wireless device 30 to send and receive information from a cellular network or some other available wireless communications network or from a peer handset. In an embodiment, the antenna and front end unit 156 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 156 may include antenna tuning and/or impedance matching components, RF power amplifiers, and/or low noise amplifiers.

The RF transceiver 158 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 150 and/or the DSP 152 or other central processing unit. In some embodiments, the RF transceiver 158, portions of the antenna and front end unit 156, and the analog baseband processing unit 150 may be combined in one or more processing units and/or application specific integrated circuits (ASICs).

The analog baseband processing unit 150 may provide various analog processing of inputs and outputs, for example analog processing of inputs from the microphone 162 and the headset port 166 and outputs to the earpiece speaker 164 and the headset port 166. To that end, the analog baseband processing unit 150 may have ports for connecting to the built-in microphone 162 and the earpiece speaker 164 that enable the wireless device 30 to be used as a cell phone. The analog baseband processing unit 150 may further include a port for connecting to a headset or other hands-free microphone and speaker configuration. The analog baseband processing unit 150 may provide digital-to-analog conversion in one signal direction and analog-to-digital conversion in the opposing signal direction. In some embodiments, at least some of the functionality of the analog baseband processing unit 150 may be provided by digital processing components, for example by the DSP 152 or by other central processing units.

The DSP 152 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 152 may perform modulation, coding, interleaving, and spreading, and for a receiver function the DSP 152 may perform despreading, deinterleaving, decoding, and demodulation. In another embodiment, for example in an orthogonal frequency division multiplex access (OFDMA) technology application, for the transmitter function the DSP 152 may perform modulation, coding, interleaving, inverse fast Fourier transforming, and cyclic prefix appending, and for a receiver function the DSP 152 may perform cyclic prefix removal, fast Fourier transforming, deinterleaving, decoding, and demodulation. In other wireless technology applications, yet other signal processing functions and combinations of signal processing functions may be performed by the DSP 152.

The DSP 152 may communicate with a wireless network via the analog baseband processing unit 150. In some embodiments, the communication may provide Internet connectivity, enabling a user to gain access to content on the Internet and to send and receive e-mail or text messages. The input/output interface 168 interconnects the DSP 152 and various memories and interfaces. The memory 154 and the removable memory card 170 may provide software and data to configure the operation of the DSP 152. Among the interfaces may be the USB interface 172 and the infrared port 174. The USB interface 172 may enable the wireless device 30 to function as a peripheral device to exchange information with a personal computer or other computer system. The infrared port 174 and other optional ports such as a BLUETOOTH interface or an IEEE 802.11 compliant wireless interface may enable the wireless device 30 to communicate wirelessly with other nearby handsets and/or wireless base transceiver stations.

The input/output interface 168 may further connect the DSP 152 to the vibrator 176 that, when triggered, causes the wireless device 30 to vibrate. The vibrator 176 may serve as a mechanism for silently alerting the user to any of various events such as an incoming call, a new text message, and an appointment reminder.

The keypad 178 couples to the DSP 152 via the input/output interface 168 to provide one mechanism for the user to make selections, enter information, and otherwise provide input to the wireless device 30. Another input mechanism may be the touch LCD screen 180, which may also display text and/or graphics to the user. The touch screen LCD controller 182 couples the DSP 152 to the touch LCD screen 180.

The CCD camera 184 enables the wireless device 30 to take digital pictures. The DSP 152 communicates with the CCD camera 184 via the camera controller 186. The GPS sensor 188 is coupled to the DSP 152 to decode global positioning system signals, thereby enabling the wireless device 30 to determine its position. In another embodiment, a camera operating according to a technology other than Charge Coupled Device cameras may be employed. Various other peripherals may also be included to provide additional functions, e.g., radio and television reception.

Figure 9:
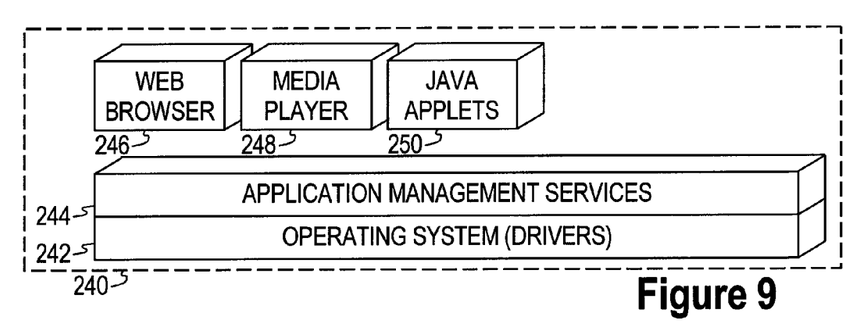
FIG. 9 illustrates a software environment that may be implemented by the handset.

FIG. 9 illustrates a software environment 240 that may be implemented by the DSP 152. The DSP 152 executes operating system drivers 242 that provide a platform from which the rest of the software operates. The operating system drivers 242 provide drivers for the handset hardware with standardized interfaces that are accessible to application software. The operating system drivers 242 include application management services ("AMS") 244 that transfer control between applications running on the wireless device 30. Also shown in FIG. 9 are a web browser application 246, a media player application 248, and JAVA applets 250. The web browser application 246 configures the wireless device 30 to operate as a web browser, allowing a user to enter information into forms and select links to retrieve and view web pages. The media player application 248 configures the wireless device 30 to retrieve and play audio or audiovisual media. The JAVA applets 250 configure the wireless device 30 to provide games, utilities, and other functionality.

Figure 10:
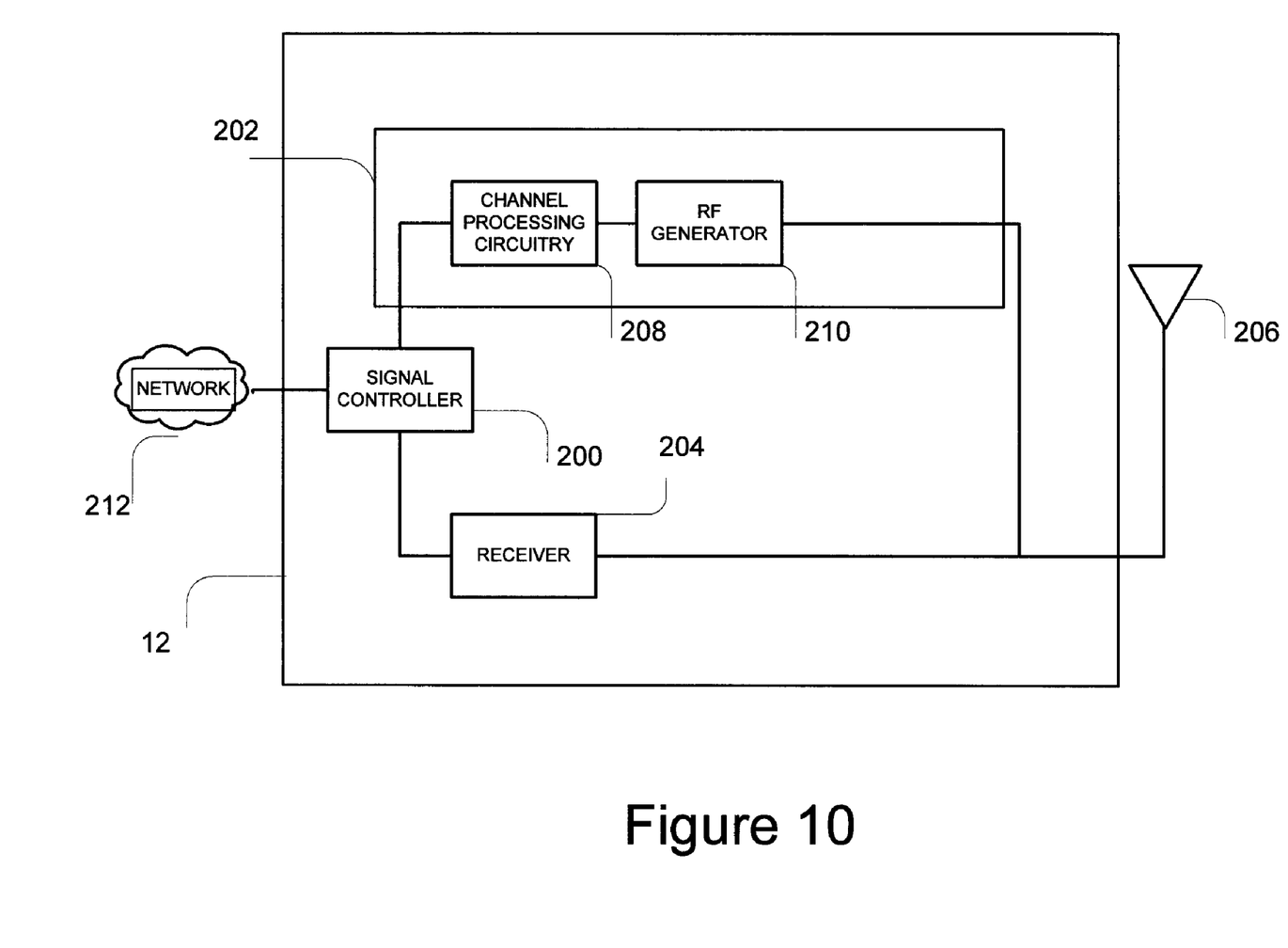
FIG. 10 is a block diagram of a base transceiver station according to an embodiment of the disclosure.

FIG. 10 illustrates one embodiment of the first base transceiver station 12 embodied as a base transceiver station that can be used with the disclosed systems. In this embodiment, the first base transceiver station 12 is a medium to high-power multi-channel, two-way radio in a fixed location. Typically it may be used by low-power, single-channel, two-way radios or wireless devices such as mobile phones, portable phones and wireless routers. The first base transceiver station 12 may comprise a signal controller 200 that is coupled to a transmitter 202 and a receiver 204. Transmitter 202 and receiver 204 (or combined transceiver) is further coupled to an antenna 206. In the first base transceiver station 12, digital signals are processed in signal controller 200. The digital signals may be signals for a wireless communication system, such as signals that convey voice or data intended for a mobile terminal (not shown). First base transceiver station 12 may employ any suitable wireless technologies or standards such as 2G, 2.5G, 3G, GSM, IMT-2000, UMTS, iDEN, GPRS, 1xEV-DO, EDGE, DECT, PDC, TDMA, FDMA, CDMA, W-CDMA, LTE, TD-CDMA, TD-SCDMA, GMSK, OFDM, WIMAX, the family of IEEE 802.11 standards, the family of IEEE 802.16 standards, IEEE 802.20, etc. Signal controller 200 then transmits the digital signals to transmitter 202, which includes a channel processing circuitry 208. Channel processing circuitry 208 encodes each digital signal, and a radio frequency (RF) generator 210 modulates the encoded signals onto an RF signal. The resulting output signal is transmitted over antenna 206 to the mobile terminal. Antenna 206 also receives signals sent to first base transceiver station 12 from the mobile terminal. Antenna 206 transmits the signals to receiver 204 that demodulates them into digital signals and transmits them to signal controller 200 where they may be relayed to an external network 212. First base transceiver station 12 may also comprise auxiliary equipment such as cooling fans or air exchangers for the removal of heat from first base transceiver station 12.

Figure 11:
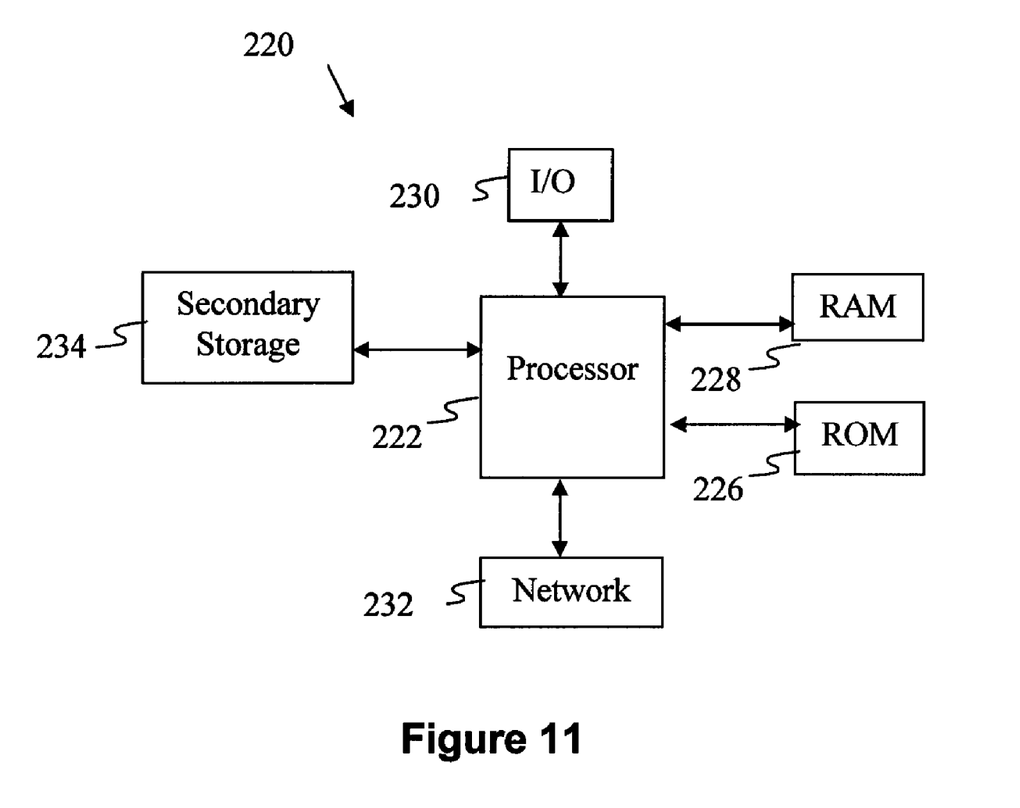
FIG. 11 illustrates an exemplary general purpose computer system suitable for implementing the several embodiments of the disclosure.

Portions of the system described above, for example the data center 40, may be implemented on any general-purpose computer with sufficient processing power, memory resources, and network throughput capability to handle the necessary workload placed upon it. FIG. 11 illustrates a typical, general-purpose computer system suitable for implementing one or more embodiments disclosed herein. The computer system 220 includes a processor 222 (which may be referred to as a central processor unit or CPU) that is in communication with memory devices including secondary storage 224, read only memory (ROM) 226, random access memory (RAM) 228, input/output (I/O) devices 230, and network connectivity devices 232. The processor may be implemented as one or more CPU chips.

The secondary storage 224 is typically comprised of one or more disk drives or tape drives and is used for non-volatile storage of data and as an over-flow data storage device if RAM 228 is not large enough to hold all working data. Secondary storage 224 may be used to store programs which are loaded into RAM 228 when such programs are selected for execution. The ROM 226 is used to store instructions and perhaps data which are read during program execution. ROM 226 is a non-volatile memory device which typically has a small memory capacity relative to the larger memory capacity of secondary storage. The RAM 228 is used to store volatile data and perhaps to store instructions. Access to both ROM 226 and RAM 228 is typically faster than to secondary storage 224.

I/O devices 230 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 232 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), and worldwide interoperability microwave access (WiMAX) radio transceiver cards, and other well-known network devices. These network connectivity devices 232 may enable the processor 222 to communicate with an Internet or one or more intranets. With such a network connection, it is contemplated that the processor 222 might receive information from the network, or might output information to the network in the course of performing the above-described method steps. Such information, which is often represented as a sequence of instructions to be executed using processor 222, may be received from and outputted to the network, for example, in the form of a computer data signal embodied in a carrier wave.

The baseband signal or signal embodied in the carrier wave generated by the network connectivity devices 232 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 222 executes instructions, codes, computer programs, scripts which it accesses from hard disk, floppy disk, optical disk (these various disk based systems may all be considered secondary storage 224), ROM 226, RAM 228, or the network connectivity devices 232. While only one processor 222 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of wirelessly transmitting multimedia data over a cellular network, comprising:
    transmitting a content from a data center to a base transceiver station;
    transmitting the content from the base transceiver station to a wireless device;
    tracking a usage of the content by a user on the wireless device;
    one of the data center, the base transceiver station, and the wireless device creating a customized content made up of segments based on the usage of the content on the wireless device by the user;
    transmitting the customized content to the base transceiver station; and
    transmitting the customized content from the base transceiver station to the wireless device.

2. The method claim 1, wherein creating the customized content is performed by the data center and further including:
    transmitting the usage of the content by the user to the base transceiver station; and
    transmitting the usage of the content by the user from the base transceiver station to the data center.

3. The method of claim 1, wherein creating the customized content is performed by the base transceiver station and further including transmitting the usage of the content by the user to the base transceiver station.

4. The method of claim 1, wherein the content to be transmitted to the wireless device is selected from the group consisting of audio content, video content, text content, and multimedia content.

5. The method of claim 1, wherein the usage of the content comprises at least one of the length of the content used by the user, the type of content used by the user, the location of the user while the content was used, and the time when the content was used.

6. The method of claim 1, further comprising adjusting the length of the customized content.

7. The method of claim 1, wherein the wireless device is one of a mobile telephone, a personal digital assistant, a computer, and a media player.

8. The method of claim 1, further comprising the wireless device repackaging the usage of the customized content.

9. The method of claim 8, wherein the repackaging is based on knowledge of at least one of a normal travel route associated with the wireless device, a normal travel duration associated with the wireless device, a current location of the wireless device, and an elapsed time of travel associated with the wireless device.

10. The method of claim 1, wherein the customized data is transmitted to the wireless device during a non-peak traffic time.

11. A system for providing customized wireless data to a user, the system comprising:
a wireless device capable of receiving segmented customized content, playing the segmented customized content for a user, recording a use pattern of the user, and transmitting the use pattern of the user;
a base transceiver station capable of transmitting content to the wireless device and is further capable of receiving the use pattern of the user from the wireless device; and
a data center capable of receiving the use pattern of the user from the base transceiver station, creating segmented customized content for the user based upon the use pattern of the user, and transmitting the segmented customized content to the user.

12. The system of claim 11, wherein the customized content is multimedia content.

13. The system of claim 11, wherein the customized content is structured into segments.

14. The system of claim 13, wherein the recording of the use pattern of the user further comprises recording what segments the user plays.

15. The system of claim 14, wherein the recording of the use pattern of the user further comprises the duration that the user uses the customized content.

16. The system of claim 14, wherein the recording of the use pattern of the user further comprises recording the location of the user's route during playback of the customized content.

17. A method of repackaging multimedia data to a wireless device, the method comprising:
receiving a plurality of content segments onto a wireless device;
determining the priority of the content segments based upon a user preferences;
reordering the content segments based upon the priority of the content segments; and
repackaging the content segments.

18. The method of claim 17, wherein the priority of the content segments is determined by explicit user choice, implicit user choice, or a combination thereof.

19. The method of claim 18, further including adjusting the length of the content segments based on the priority of the content segments.

20. The system of claim 11, wherein the customized content is selected from the group consisting of: audio content, video content, and text content.

* * * * *